United States Patent Office 3,413,309
Patented Nov. 26, 1968

3,413,309
PROCESS FOR PREPARING NITRILES OF CYCLOALIPHATIC OR HETEROCYCLIC ACIDS
Mieczyslaw J. Makosza, Jelonki, Osiedle Przyjazn 148; Barbara J. Serafin, Bobola Str. 6; and Tadeusz L. Urbanski, Nowowiejska Str. 22, all of Warsaw, Poland
No Drawing. Filed Feb. 18, 1964, Ser. No. 345,797
Claims priority, application Poland, Feb. 18, 1963, P 100,789
9 Claims. (Cl. 260—333)

This invention relates to a process for preparing substituted cycloaliphatic or heterocyclic acid nitriles of the general formula

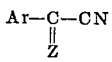

in which Ar is an aryl, e.g. $C_6H_5$, p-$CH_3C_6H_5$, or a heterocyclic substituent, e.g. 3-pyridyl or 2-thienyl, Z is a

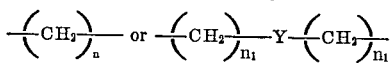

group, Y being a bivalent atom or atom group, e.g., —O—, —S—, —N·$CH_3$—, etc., $n$ being an integer from 2 to 6, each $n_1$ being the same integer of from 1 to 3, and the hydrogen in one or more of the methylene groups being optionally substituted by an alkyl group or an aryl group.

According to the present invention, the compounds are prepared by condensation of nitriles of general formula $ArCH_2CN$, Ar being as specified above, with dihalogeno derivatives of the general formula

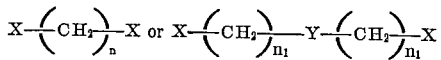

X being a halogen atom and the other symbols are as specified above.

The condensation is carried out at 20–100° C. in the presence of alkali metal hydroxides as condensing agents and any quaternary ammonium compound as catalyst. Water, organic solvents, or mixtures thereof are used as reaction medium. The alkali metal hydroxide may be used as solution or powdered solid suspended in solvents. The amount of the catalyst used is less than 0.1 mole/1 mole nitrile. The order of addition of the reactants is optional.

The process is carried out most conveniently with the reactants used in molar proportions, optionally with neutral diluents of the organic phase, e.g. benzene, as addition.

Quaternary ammonium compounds may be replaced by ternary amines as catalysts, which during the reaction with the alkylating agent yield the corresponding ammonium compounds.

The substituted cycloaliphatic or heterocyclic acid nitriles prepared according to the present invention differ considerably in physical properties from the starting reactants, so that they can be separated in pure form by distillation or crystallization.

The following specific examples will further illustrate but not limit, the present invention:

Example I

Phenyl acetonitrile, 117 g. (1.0 mole), is mixed with 170 g. sodium hydroxide in 350 ml. propanol, and then 3 g. tetraethylammonium hydroxide and 143 g. (1.0 mole) β,β'-dichloro-diethyl ether are added. The reaction is carried out for 6 hrs. at 40–60° C. with vigorous stirring. After completion of the reaction, 4-phenyl-4-cyano-tetrahydropyran (127 g., 68%), B.P. 110°/1 mm., is separated by vacuum distillation.

Example II p-Methyl-phenyl acetonitrile (131 g., 1.0 mole) is mixed with 210 g. (1 mole) 1,5-dibromo pentane and 600 ml. benzene. Tetramethylammonium iodide, 4 g., and 400 ml. aqueous 40% sodium hydroxide are added and the mixture is refluxed 10 hrs. with stirring. After dilution with water, the organic layer is distilled to collect 1 - (p-methylphenyl) - cyclohexanecarboxylic acid nitrile (105 g., 53%), B.P. 135°/2 mm.

Example III p-Methoxyphenyl acetonitrile, 147 g., 215 g. 1,4-dibromo butane, 340 g. potassium hydroxide, 750 ml. ethylene glycol, and 6 g. trimethylbenzylammonium hydroxide (Triton B) are mixed together and stirred for 5 hrs. After decomposition with water, the reaction mixture is distilled to collect 1-(p-methoxyphenyl)cyclopentanecarboxylic acid nitrile (172 g., 85%), B.P. 140°/1 mm.

We claim:
1. A process for preparing substituted cycloaliphatic or heterocyclic acid nitriles of the general formula

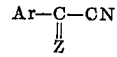

in which Ar is a phenyl, p-tolyl or p-methoxyphenyl group and Z is a

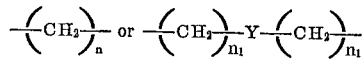

group, $n$ being an integer from 2 to 6, each $n_1$ being the same integer of from 1 to 3, and Y being —O—, —S— or —N·$CH_3$—, comprising condensing at a temperature in the range of 20 to 100° C. a nitrile of the formula Ar—$CH_2$—CN, Ar being as defined above, with a compound selected from the group consisting of

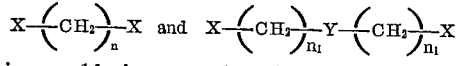

X being a chlorine or a bromine atom and the other symbols being as defined above, in the presence of an alkali metal hydroxide, which acts as a condensing agent, and less than 0.1 mol per mol of the Ar-$CH_2$-CN of a compound selected from the group consisting of tetraethyl ammonium hydroxide, tetramethyl ammonium iodide and trimethyl benzyl ammonium hydroxide, which acts as a catalyst.

2. A method according to claim 1, in which Y is —O—.
3. A method according to claim 2, in which $n$ is 5 or 6 and $n_1$ is 3.
4. A method according to claim 3, in which the acid nitrile which is prepared is 4-phenyl-4-cyanotetrahydropyran, Ar-$CH_2$-CN is phenyl acetonitrile and the compound condensed with the phenyl acetonitrile is

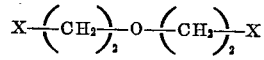

wherein X is a chlorine or a bromine atom.

5. A method according to claim 4, in which the compound condensed with the phenyl acetonitrile is β,β'-dichloro-diethyl ether, the condensing agent is sodium hydroxide and the catalyst is tetraethyl ammonium hydroxide.

6. A method according to claim 3, in which the acid nitrile which is prepared is 1-(p-tolyl)cyclohexane carboxylic acid nitrile, Ar-$CH_2$-CN is p-tolyl acetonitrile and the compound condensed with the p-tolyl acetonitrile is

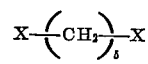

wherein X is a chlorine or a bromine atom.

7. A method according to claim 6, in which the compound condensed with the p-tolyl acetonitrile is 1,5-dibromopentane, the condensing agent is sodium hydroxide and the catalyst is tetramethyl ammonium iodide.

8. A method according to claim 3, in which the acid nitrile which is prepared is 1-(p-methoxyphenyl)cyclopentane carboxylic acid nitrile, Ar–CH$_2$–CN is p-methoxyphenyl acetonitrile and the compound condensed with the p-methoxyphenyl acetonitrile is

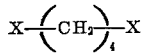

wherein X is a chlorine or a bromine atom.

9. A method according to claim 8, in which the compound condensed with the p-methoxyphenyl acetonitrile, is 1,4-dibromopentane, the condensing agent is potassium hydroxide and the catalyst is trimethyl benzyl ammonium hydroxide.

References Cited

UNITED STATES PATENTS 2,242,575    5/1941    Eisleb et al. _____ 260—333

OTHER REFERENCES

Tilford et al., Amer. Chem. Soc. Jour., November 1947, vol. 69, pages 2902 and 2903.

CHARLES B. PARKER, *Primary Examiner.*

D. H. TORRENCE, *Assistant Examiner.*